United States Patent
Burchard (10) Patent No.: US 10,839,316 B2
(45) Date of Patent: Nov. 17, 2020

(54) SYSTEMS AND METHODS FOR LEARNING AND PREDICTING TIME-SERIES DATA USING INERTIAL AUTO-ENCODERS

(71) Applicant: Goldman Sachs & Co. LLC, New York, NY (US)

(72) Inventor: Paul Burchard, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 214 days.

(21) Appl. No.: 15/666,379

(22) Filed: Aug. 1, 2017

(65) Prior Publication Data

US 2018/0039913 A1 Feb. 8, 2018

Related U.S. Application Data

(60) Provisional application No. 62/372,206, filed on Aug. 8, 2016.

(51) Int. Cl.
*G06N 20/00* (2019.01)
*G06N 5/04* (2006.01)
*G06N 3/04* (2006.01)

(52) U.S. Cl.
CPC ........... *G06N 20/00* (2019.01); *G06N 3/0445* (2013.01); *G06N 3/0454* (2013.01); *G06N 5/04* (2013.01)

(58) Field of Classification Search
CPC ................................ G06N 3/0445; G06N 5/04
See application file for complete search history.

(56) References Cited

U.S. PATENT DOCUMENTS

| | | | |
|---|---|---|---|
| 5,040,214 A | 8/1991 | Grossberg et al. | |
| 5,125,105 A | 6/1992 | Kennedy et al. | |
| 5,377,305 A * | 12/1994 | Russo | G06N 3/0454 706/25 |
| 5,761,386 A | 6/1998 | Lawrence et al. | |
| 6,928,398 B1 * | 8/2005 | Fang | G06Q 10/06 703/2 |
| 7,574,416 B2 * | 8/2009 | Aparicio, IV | G06K 9/6211 382/103 |
| 9,146,546 B2 | 9/2015 | Sinyayskiy et al. | |
| 9,373,059 B1 * | 6/2016 | Heifets | G16B 40/00 |

(Continued)

OTHER PUBLICATIONS

Zhao et al., "A novel bidirectional mechanism based on time series model for wind power forecasting", Elsevier, Jun. 2016. (Year: 2016).*

(Continued)

*Primary Examiner* — Alexey Shmatov
*Assistant Examiner* — Beatriz Ramirez Bravo (57) ABSTRACT

A method includes using a computational network to learn and predict time-series data. The computational network is configured to receive the time-series data and perform transformation-invariant encoding of the time-series data. The computational network includes one or more encoding layers. The method also includes feeding back future predictions of the time-series data through inertial adjustments of transformations. The inertial adjustments preserve the invariants in the computational network. The computational network could further include one or more pooling layers each configured to reduce dimensionality of data, where the one or more pooling layers provide the transformation invariance for the encoding.

21 Claims, 5 Drawing Sheets

(56) References Cited

U.S. PATENT DOCUMENTS

| | | | |
|---|---|---|---|
| 2008/0310687 A1* | 12/2008 | Hua | G06K 9/00288 382/118 |
| 2013/0297541 A1 | 11/2013 | Piekniewski et al. | |
| 2015/0205691 A1* | 7/2015 | Seto | G06F 11/008 702/182 |
| 2015/0227849 A1* | 8/2015 | Jaros | G06N 7/005 706/12 |
| 2015/0278635 A1* | 10/2015 | Poggio | G06K 9/4628 382/118 |
| 2016/0071211 A1* | 3/2016 | Aravkin | G06Q 40/06 705/36 R |
| 2016/0092764 A1 | 3/2016 | Burchard | |
| 2016/0140434 A1 | 5/2016 | Yilmaz et al. | |
| 2016/0232440 A1 | 8/2016 | Gregor et al. | |
| 2017/0091615 A1* | 3/2017 | Liu | G06N 3/0445 |
| 2017/0150235 A1* | 5/2017 | Mei | H04N 21/8405 |
| 2017/0286846 A1* | 10/2017 | Hawkins | G06N 3/049 |
| 2018/0024968 A1* | 1/2018 | Clinchant | G06N 3/0454 706/12 |
| 2018/0032871 A1* | 2/2018 | Holt | G06N 3/0454 |

OTHER PUBLICATIONS

Grant Foster, "Time Series Analysis by Projection II. Tensor Methods for Time Series Analysis", 1996. (Year: 1996).*

Xiao Hu et al., "Time Series Prediction with a Weighted Bidirection Multi-stream extended Kalman Filter", Elsevier, 2007. (Year: 2007).*

Cho et al., "Learning Phrase Representations using RNN Encoder-Decoder for Satistical Machine Translation", 2014. (Year: 2014).* https://openai.com/blog/generative-models/—"Generative Models", published online Jun. 2016. (Year: 2016).*

Hans Bludszuweit et al., "Statistical Analysis of Wind Power Forecast Error", IEEE Transaction on Power Systems, 2008. (Year: 2008).*

Junbo Zhao et al., "Stacked What-Where Auto-Encoders", Workshop Track—ICLR, Feb. 2016. (Year: 2016).*

Yongning Zhao et al., "A novel bidirectional mechanism based on time series model for wind power forecasting", Elsevier, (Jun. 2016) (Year: 2016).*

Xi Li et al., "Robust Visual Tracking Based on Incremental Tensor Subspace Learning", IEEE, (2007) (Year: 2007).*

Jimeng Sun et al., "Incremental Tensor Analysis: Theory and Applications", ACM Transactions on Knowledge Discovery from Data, vol. 2, No. 3, Article 11, (Oct. 2008) (Year: 2008).*

Broomhead et al., "Radial Basis Functions, Multi-Variable Functional Interpolation and Adaptive Networks," Royal Signals & Radar Establishment Malvern (United Kingdom), RSRE Memorandum No. 4148, Publication (online) Mar. 28, 1988, Retrieved Sep. 26, 2017 from <http://www.dtic.mil/get-tr-doc/pdf?AD=ADA196234?, 39 pages.

Le, "A Tutorial on Deep Learning Part 2: Autoencoders, Convolutional Neural Networks and Recurrent Neural Networks," In: Google Brain, Oct. 20, 2015, retrieved from <http://ai.stanford.edu/~quocle/tutorial2.pdf>, 40 pages.

Prasad et al., "Deep Recurrent Neural Networks for Time-Series Prediction," In: arXiv preprint, Aug. 15, 2014, retrieved from <https://arxiv.org/ftp/arxiv/papers/1407/1407.5949.pdf>, 36 pages.

Socher et al., "Recursive Deep Models for Semantic Compositionality Over a Sentiment Treebank," Conference on Empirical Methods in Natural Language 2013; Seattle, Washington, USA; Oct. 18-21, 2013; 12 pages.

International Search Report and Written Opinion for International Application No. PCT/US2017/049358, dated Nov. 7, 2017, 9 pages.

International Search Report and Written Opinion for International Application No. PCT/US2017/044963, dated Oct. 18, 2017, 7 pages.

W. Shane Grant et al., "Biologically plausible learning in neural networks with modulatory feedback", Neural Networks, 88, Jan. 28, 2017, p. 32-48.

Erol Egrioglu et al., "Recurrent Multiplicative Neuron Model Artificial Neural Network for Non-Linear Time Series Forecasting", 2nd World Conference on Business, Economics and Management—WCBEM 2013, Procedia—Social and Behavioral Sciences, 109, Jan. 28, 2014, p. 1094-1100.

Jurgen Schmidhuber, "Deep Learning in Neural Networks: An Overview", Oct. 8, 2014, 88 pages.

Ozan Irsoy & Claire Cardie, Modeling Compositionality With Multiplicative Recurrent Neural Networks, May 2, 2015, 10 pages.

Marijn F. Stollenga et al., "Deep Networks with Internal Selective Attention through Feedback Connections", Jul. 11, 2014, 9 pages.

Ilya Sutskever et al., "Generating Text with Recurrent Neural Networks", Jan. 2011, 8 pages.

Emilio Salinas et al., "A model of multiplicative neural responses in parietal cortex", Proc. Natl. Acad. Sci., vol. 93, Oct. 1996, p. 11956-11961.

Michael Schmitt, "On the Complexity of Computing and Learning with Multiplicative Neural Networks", Feb. 1, 2002, 63 pages.

Paul Burchard, "Systems and Methods for Learning and Predicting Time-Series Data Using Deep Multiplicative Networks", U.S. Appl. No. 15/681,942, filed Aug. 21, 2017.

Chung et al., "Gated Feedback Recurrent Neural Networks", Dept. IRO, Universite de Montreal, Jun. 2015, 9 pages.

Communication dated May 12, 2020 in connection with European Patent Application No. 17847459.9, 8 pages.

Communication pursuant to Rules 70(2) and 70a(2) EPC dated Jun. 3, 2020 in connection with European Patent Application No. 17847459.9, 1 page.

\* cited by examiner

SYSTEMS AND METHODS FOR LEARNING AND PREDICTING TIME-SERIES DATA USING INERTIAL AUTO-ENCODERS

CROSS-REFERENCE TO RELATED APPLICATION AND PRIORITY CLAIM

This application claims priority under 35 U.S.C. § 119(e) to U.S. Provisional Patent Application No. 62/372,206 filed on Aug. 8, 2016. This provisional application is hereby incorporated by reference in its entirety.

TECHNICAL FIELD

This disclosure relates generally to machine learning and data prediction. More specifically, this disclosure relates to systems and methods for learning and predicting time-series data using inertial auto-encoders.

BACKGROUND

"Machine learning" generally refers to computing technology that is designed to learn from and perform predictive analysis on data. Neural networks are one example type of machine learning technique based on biological networks, such as the human brain. In neural networks, data processing is performed using artificial neurons, which are coupled together and exchange processed data over various communication links. The "learning" aspect of neural networks can be implemented by altering weights associated with the communication links so that some data is treated as being more important than other data.

A "time series prediction" refers to a prediction made by a machine learning algorithm using time-series data, such as data values that are collected over time via one or more sensory inputs. Time series prediction is an important component of intelligence. For example, an intelligent entity's ability to predict a time series of inputs can allow the intelligent entity to create a model of the world (or some smaller portion thereof).

SUMMARY

This disclosure provides systems and methods for learning and predicting time-series data using inertial auto-encoders.

In a first embodiment, a method includes using a computational network to learn and predict time-series data. The computational network is configured to receive the time-series data and perform transformation-invariant encoding of the time-series data. The computational network includes one or more encoding layers. The method also includes feeding back future predictions of the time-series data through inertial adjustments of transformations. The inertial adjustments preserve the invariants in the computational network.

In a second embodiment, an apparatus includes at least one processing device and at least one memory storing instructions. The instructions, when executed by the at least one processing device, cause the at least one processing device to learn and predict time-series data using a computational network. The computational network is configured to receive the time-series data and perform transformation-invariant encoding of the time-series data. The computational network includes one or more encoding layers. The instructions, when executed by the at least one processing device, also cause the at least one processing device to feed back future predictions of the time-series data through inertial adjustments of transformations. The inertial adjustments preserve the invariants in the computational network.

In a third embodiment, a non-transitory computer readable medium contains instructions that, when executed by at least one processing device, cause the at least one processing device to learn and predict time-series data using a computational network. The computational network is configured to receive the time-series data and perform transformation-invariant encoding of the time-series data. The computational network includes one or more encoding layers. The medium also contains instructions that, when executed by the at least one processing device, cause the at least one processing device to feed back future predictions of the time-series data through inertial adjustments of transformations. The inertial adjustments preserve the invariants in the computational network.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, time series prediction is an important component of intelligence, such as when it allows an intelligent entity (like a person) to create a model of the world around him or her. However, motor intent by an intelligent entity may naturally form part of a time series, as well. "Motor intent" generally refers to intended motor movements associated with neural signals, such as moving one's arm or leg or opening/closing one's hand based on different neural signals. Predictions that include past motor intent allow modeling of the effects of that motor intent on the surrounding world. Moreover, if an intelligent entity includes a control system that can compute optimal motor intents relative to some high-level goals for affecting the world, the ability to predict future motor intents can occur more accurately without always having to perform a full optimization, which can provide enormous savings in computations and energy usage.

In one aspect of this disclosure, a device, system, method, and computer readable medium for learning and predicting time-series data are provided. The learning and predicting are accomplished using one or more auto-encoders that support feed-forward and feedback along with inertial adjustment. For example, the learning and predicting can be supported by abstracting high-level transformation-invariant understanding and then feeding back detailed future predictions of time-series data through inertial adjustment of transformations while preserving the invariants.

Figure 1:
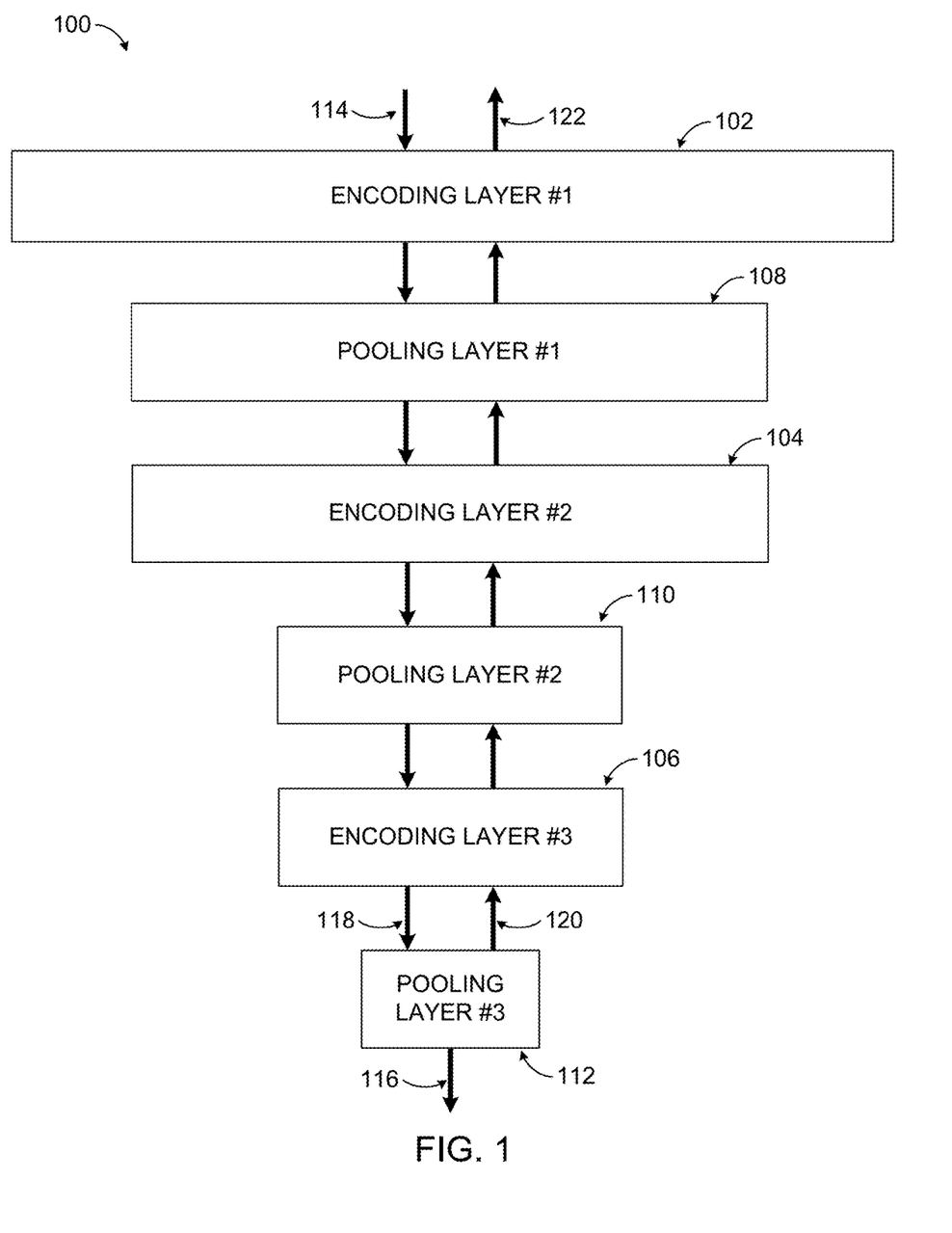
FIG. 1 illustrates an example architecture implementing an inertial auto-encoder for learning and predicting time-series data according to this disclosure.

FIG. 1 illustrates an example architecture 100 implementing an inertial auto-encoder for learning and predicting time-series data according to this disclosure. As shown in FIG. 1, the architecture 100 includes multiple encoding layers and multiple pooling layers. In this example, the architecture 100 includes three encoding layers 102-106 and three pooling layers 108-112, although other numbers of encoding and pooling layers could be used. In some instances, the architecture 100 could include a single encoding layer and a single pooling layer.

Each of the encoding layers 102-106 generally performs computations to encode or otherwise process incoming data, while each of the pooling layers 108-112 generally performs computations to provide dimensional reduction. Dimensional reduction refers to the process of receiving a larger amount (higher bandwidth) of sensory or other input data and reducing the data down to a smaller amount (lower bandwidth) of descriptive concepts.

Each of the layers 102-112 includes any suitable structure(s) for encoding data, providing dimensional reduction, or performing any other suitable processing operations. For example, each of the layers 102-112 could be implemented using hardware or a combination of hardware and software/firmware instructions.

Each of the encoding and pooling layers 102-112 generally receives input values and operates to produce output values. Inputs 114 provided to the first encoding layer 102 could denote any suitable sensory or other inputs and can include time-series data (possibly including motor inputs). Outputs 116 provided by the last pooling layer 112 could denote data that is generated by the combination of operations performed by the encoding and pooling layers 102-112, such as high-level conceptual understanding of the time-series data. The outputs 116 can therefore represent an encoding or other representation of the inputs 114.

In FIG. 1, additional data exchanges 118 and 120 occur between adjacent layers (although the data exchanges need not be limited to use with adjacent layers). The data exchanges 118 denote "feed-forward" data exchanges in which data is being provided from one layer to a subsequent layer in the process flow. In contrast, the data exchanges 120 denote "feedback" data exchanges in which data is being provided from one layer to a prior layer in the process flow.

In some embodiments, the architecture 100 shown in FIG. 1 can be used to implement an auto-encoder. An "auto-encoder" is a type of neural network or other machine learning algorithm that attempts to generate an encoding for a set of data. The encoding denotes a representation of the set of data but with reduced dimensionality. In the ideal case, the encoding allows the auto-encoder to predict future values in time-series data based on initial values in the time-series data. The ability to predict time-series data can find use in a large number of applications.

In general, the network implementing an auto-encoder is generally designed so that its outputs approximately reproduce its inputs. When applied to time-series data, an auto-encoder is "causal" in the sense that only past information is used to reproduce future information. Iteratively, such a causal auto-encoder can reproduce the whole time series from itself, meaning the causal auto-encoder can identify the entire time series based on the time series' initial values. Ideally, the encoding of the inputs 114 by the encoding layers 102-106 is done so that the final encoded representation of the inputs 114 (the outputs 116) is highly constrained (such as sparse). The encoded representation of the inputs 114 can also ideally be used to generate predicted next inputs 122, which represent an approximate reproduction of the inputs 114. For time-series data, a causal auto-encoder would approximately reproduce future inputs as the predicted next inputs 122 based on past inputs 114, allowing the causal auto-encoder to make predictions for the time-series data.

In some embodiments, a causal auto-encoder could be most useful when the ultimate encoding is as high-level and invariant as possible so that the same encoding can be used for many time steps. Invariance can be achieved in a network of one or more encoding layers 102-106 through the addition of the one or more pooling layers 108-112, which reduce the dimensionality of the information in ways that leave each encoding layer's outputs invariant to typical transformations of the encoding layer's inputs. For example, so-called $l^2$ pooling layers can provide invariance to unitary group representations. However, to approximately reproduce the original input 114 one time step later (as required of a causal auto-encoder), discarded non-invariant information needs to be added back into the calculations. In accordance with this understanding, rather than using a pure feed-forward network for an auto-encoder, the feed-forward data exchanges 118 can be used to compute high-level invariant encoding as the output 116, and the feedback data exchanges 120 through the same network can be used to enrich the predicted next inputs 122 with non-invariant information.

As an example of this functionality, assume that a specific person is contained in a sequence of images being analyzed. A neural network or other machine learning algorithm may need to recognize this person in a scene independent of his or her position, orientation, stance, lighting, clothing, etc. However, to predict the next frame in the sequence of images, the network cannot only remember the person and forget his or her position, orientation, stance, lighting, clothing, etc. Instead, those non-invariant aspects could constantly change, and the network should be able to project into the future what the new values of those non-invariant aspects will be. "Inertial" projections are the most likely predictions of the future values of those non-invariant aspects, assuming nothing unexpected happens. An inertial projection typically uses at least two past values of the non-invariant aspect to make its prediction.

Figure 2:
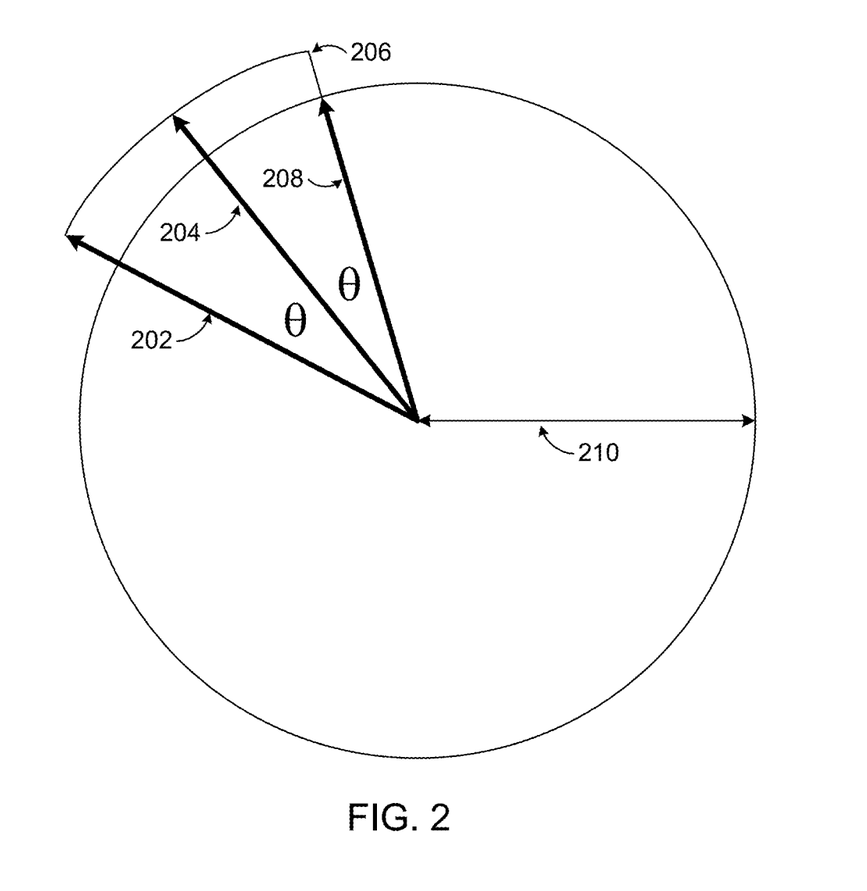
FIG. 2 illustrates example functionality of an inertial auto-encoder for use in learning and predicting time-series data according to this disclosure.

The specific ways in which the non-invariant information can be used in the causal setting to predict one time step ahead can vary depending on the implementation. Some embodiments, such as those consistent with physics concepts, involve the assumption of a Newtonian world in which dynamics are second-order and momentum continues undisturbed in the absence of any forces. FIG. 2 illustrates functionality of an example inertial auto-encoder for use in learning and predicting time-series data according to this disclosure. The inertial auto-encoder could be implemented using the architecture 100 shown in FIG. 1, and Newtonian dynamics could be used for non-invariant information. In this type of implementation, each node (encoding layer) in a network can remember its activations from one time step in the past. A "remembered" past activation 202 can be used in conjunction with a current activation 204 to generate some type of projection 206, and a resulting "inertial" future activation 208 prior to pooling can be slightly adjusted if necessary to be consistent with the already fed-back future invariant activation after pooling 210.

The following provides details of one specific example way in which an inertial auto-encoder can be constructed. These details are examples only, and other inertial auto-encoders could be designed in this manner or in any other suitable manner.

In one example implementation, an inertial auto-encoder network includes a sequence of layer pairs, namely an encoding layer 102, 104, 106 followed by a $l^2$ pooling layer 108, 110, 112. Sensory, motor, or other inputs 114 to the network are fed-forward from the initial layer to the final layer of the network (resulting in fully-encoded outputs 116) and inertially reconstructed by feedback in the form of the data exchanges 120 from the final layer back to the initial layer of the network (resulting in the predicted next inputs 122 of the network).

Consider a single pair of layers having one encoding layer and one subsequent pooling layer. In a feed-forward data exchange 118, an input $x_\tau$ at time $\tau$ is fed-forward through the encoding layer to yield an encoded output $y_\tau$. The encoded output $y_\tau$ is fed-forward through the pooling layer to produce a pooled encoded output $z_\tau$, which is fed-forward to the next pair of layers (with the final such encoded output provided as an output 116). The value of $y_{\tau-1}$ is remembered from the previous feed-forward pass. In feedback, the value of $z_{\tau+1}$ is given, and $y_{\tau+1}$ is taken to be the arc projection (projection 206) from $y_{\tau-1}$ through $y_\tau$ and normalized to produce $z_{\tau+1}$ after pooling. The predicted input $x_{\tau+1}$ is obtained by inverting the encoding of $y_{\tau+1}$.

In more detail, assume $x_\tau$ and $z_\tau$ are vectors and $y_\tau$ is a matrix with the normalization $\|x_\tau\|=\|z_\tau\|=1$. An encoding layer 102, 104, 106 can be defined by an encoding tensor F such that $y_\tau$ is generated from $x_\tau$ by minimizing the feed-forward energy as follows:

$$E_{ff}=\|y_\tau-Fx_\tau\|^2+\lambda\||y_\tau|_l\|_{l^1}$$

where $|y|_i=\|y_i\|$ is the vector of row-wise $l^2$ norms of a matrix. The $l^2$ pooling layer 108, 110, 112 is defined by $z_\tau=|y\tau|/\|y_\tau\|$, which reduces the dimension of the output by the dimension of the rows of $y_\tau$. The $l^1$ norm in the above energy $E_{ff}$ ensures that the output $z_\tau$ is sparse and thereby provides a higher-level encoding of the input.

To train the network, during feed-forward, the encoding tensor F can be incremented by a small multiple of the local negative energy gradient, such as in the following manner:

$$(y_{\tau(pred)}-Fx_\tau)\otimes x_{\tau(pred)}$$

Here, $x_\tau$ is the actual input, $x_{\tau(pred)}$ is the previously-predicted input, and $y_{\tau(pred)}$ is the previously-predicted encoded output.

During feedback, given a predicted next output $z_{\tau+1}$, the predicted next encoding $y_{\tau+1}$ can be computed "inertially" as the row-wise arc projection $p_{\tau+1}$ from $y_{\tau-1}$ through $y_\tau$ as follows:

$$p_{\tau+1,i}=2\frac{y_{\tau-1,i}\cdot y_{\tau,i}}{\|y_{\tau,i}\|^2}y_{\tau,i}-y_{\tau-1,i}$$

This can be row-wise normalized as follows:

$$y_{\tau+1,i}=z_{\tau+1,i}\frac{p_{\tau+1,i}}{\|p_{\tau+1,i}\|}$$

so that $z_{\tau+1}=|y_{\tau+1}|/\|y_{\tau+1}\|$ as desired. The predicted next input $x_{\tau+1}$ can be generated from $y_{\tau+1}$ by minimizing the feedback energy as follows:

$$E_{fb}=\|y_{\tau+1}-Fx_{\tau+1}\|^2+\mu\|x_{\tau+1}-x_\tau\|_{l^1}$$

which can be normalized so that $\|x_{\tau+1}\|=1$. This type of physical inertia can be used to learn invariance to physical transformations, such as translation, rotation, and scaling of images.

Figure 3:
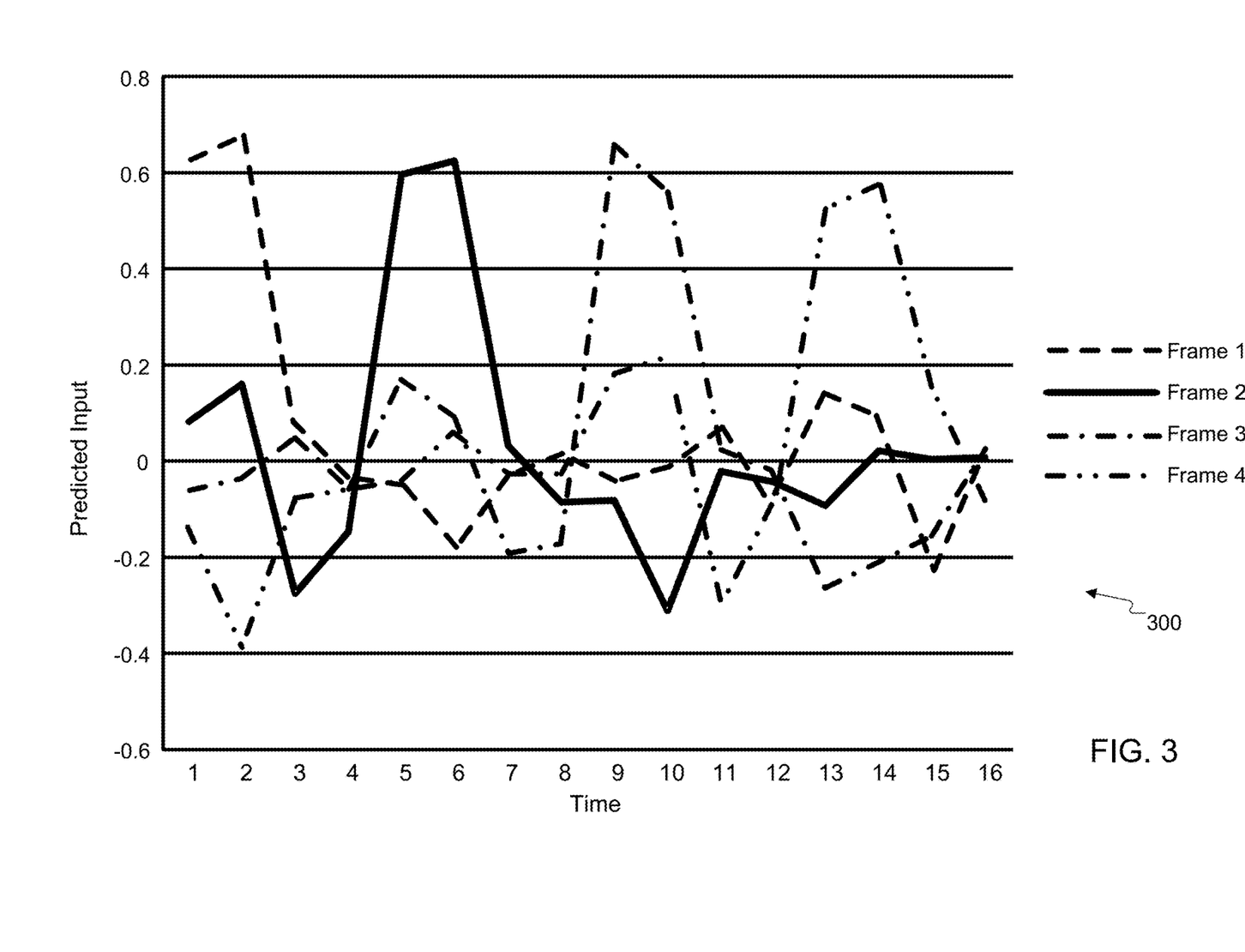
FIG. 3 illustrates example predictions using an inertial auto-encoder that has learned to predict time-series data according to this disclosure.

Among other uses, a network formed using a single encoding layer and a single $l^2$ pooling layer can be sufficient to learn to predict the inertial motion of objects in one-dimensional videos. After being trained on videos of a variety of one-dimensional objects moving at a variety of speeds, the network can effectively learn the Fourier Transform so that the $l^2$ pooling layer precisely calculates the translation invariants of the video frames. When left to run freely, the network could then generate videos of objects moving at constant speed (an example of which is shown in FIG. 3 and described below).

Note that the arc projection used above is just one possible embodiment of inertial prediction. In other embodiments, suppose that the invariants represent "stories" or specific sequences of patterns in a specific order, possibly observed at varying speeds. This type of invariance and prediction can be captured using a different projection function while still using $l^2$ pooling. For example, let the dimensions of y represent different patterns that are supposed to occur in a sequence. If the values of y cycle through $e_1, \ldots, e_n$ in sequence (where $e_i$ is the unit vector in the $i^{th}$ direction), this is meant to be an instance of the story at unit speed and produces a pooled invariant output of "1." The inertial projection that allows the story to proceed at different speeds hold that the $i^{th}$ frame $e_i$ followed by the $j^{th}$ frame $e_j$ of the story yields a prediction of the inertially projected frame $e_{2j-i(mod\ n)}$. This defines a sequence projection $y_{\tau-1}\otimes y_\tau \rightarrow y_{\tau+1}$, which is a bilinear projection with basis values defined by $e_i\otimes e_j\rightarrow e_{2j-i(mod\ n)}$.

In still other embodiments, human language has many interesting statistical properties, one of which is known as "Zipf's Law." Zipf's Law states that, at any level of granularity (say words), the frequency of the next unit given the current unit follows a power law distribution with a power of approximately −1. However, it is possible to go deeper since context is important. Thus, the frequency of the next unit given the two previous units has a faster decaying power law with a power of approximately −2. This dependence is generally not additive and does not have an OR-like dependency on the previous units. Instead, this dependence is more of a multiplicative, AND-like dependence. As a result, given unit vectors $e_i$ and $e_j$ in the direction of each of the two previous units, the inertial prediction of the distribution of the next unit defines a memory projection $y_{\tau-1}\otimes y_\tau\rightarrow y_{\tau+1}$, which is a bilinear function $e_i\otimes e_j\rightarrow\Sigma_k P_{ijk}e_k$, where $P_{ijk}$ are frequencies that can be learned through experience. In natural language, the frequencies $P_{ijk}$ can be distributed according to a power law distribution with a power of approximately −1/2, giving them a kind of sparsity and a decaying distribution. This helps to bound the amount of memory needed to make inertial predictions.

Note that the above description has provided examples of different types of projections that could be used with the architecture 100. These have included projections used with physical inertia, sequence inertia, and memory inertia. However, any other suitable types of projections could be used with the architecture 100.

Although FIGS. 1 and 2 illustrate one example of an architecture 100 implementing an inertial auto-encoder for learning and predicting time-series data and one example of functionality of an inertial auto-encoder for use in learning and predicting time-series data, various changes may be made to FIGS. 1 and 2. For example, the architecture 100 need not include three encoding layers and three pooling layers and could include other numbers of encoding layers and pooling layers in any suitable arrangement.

FIG. 3 illustrates example predictions using an inertial auto-encoder that has learned to predict time-series data according to this disclosure. As noted above, a single-layer-pair network (a single encoding layer and a single pooling layer) in the architecture 100 can be sufficient to learn to predict the inertial motion of objects in one-dimensional videos. After being trained on videos of a variety of one-dimensional objects moving at a variety of speeds, the network can effectively learn the Fourier Transform so that the $l^2$ pooling precisely calculates translation invariants of the video frames.

When such a network is left to run freely, the network could generate videos of objects moving at constant speed. An example of this is shown in FIG. 3, where a graph 300 contains the predictions for four video frames plotted over time. As can be seen in FIG. 3, the predictions made by the network reach their broad peaks in sequence. The predictions for the first frame peak first, followed by the predictions for the second, third, and fourth frames in sequence. The predictions for the different frames also broadly peak at a substantially constant interval. Together, this indicates that the network is generating predictions that accurately predict the movement of an object at a constant speed.

Although FIG. 3 illustrates one example of predictions using an inertial auto-encoder that has learned to predict time-series data, various changes may be made to FIG. 3. For example, an inertial auto-encoder could be used to perform any other suitable functions.

Figure 4:
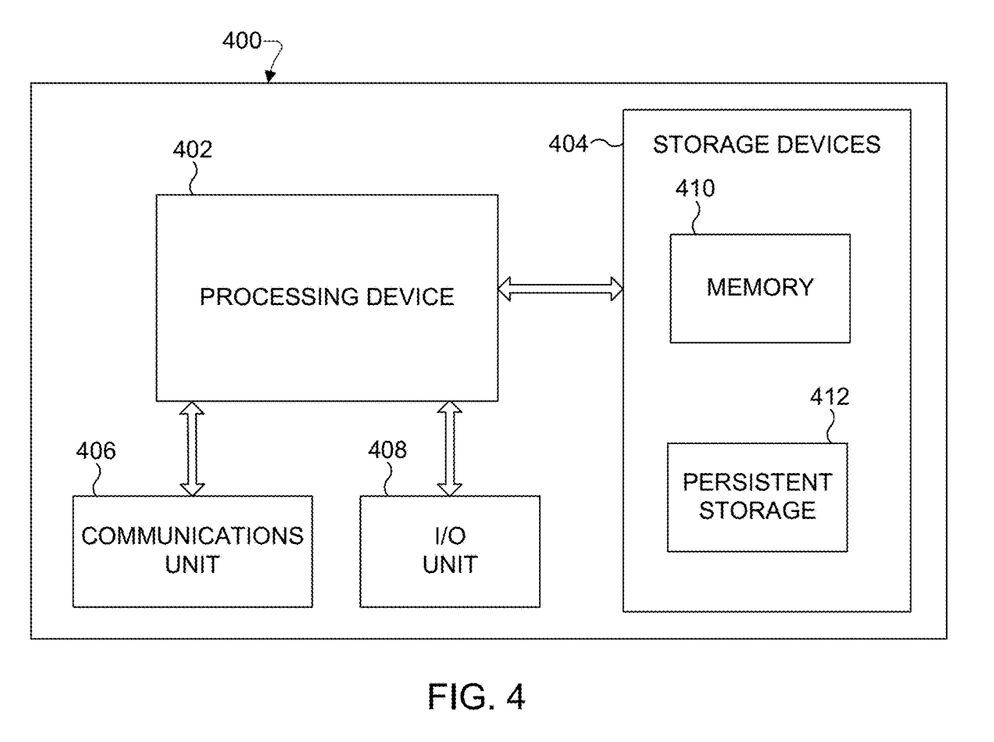
FIG. 4 illustrates an example system for learning and predicting time-series data according to this disclosure.

FIG. 4 illustrates an example system for learning and predicting time-series data according to this disclosure. As shown in FIG. 4, a computing system 400 includes at least one processing device 402, at least one storage device 404, at least one communications unit 406, and at least one input/output (I/O) unit 408.

The processing device 402 executes instructions that may be loaded into a memory 410. The processing device 402 includes any suitable number(s) and type(s) of processors or other devices in any suitable arrangement. Example types of processing devices 402 include microprocessors, microcontrollers, digital signal processors, field programmable gate arrays, application specific integrated circuits, and discrete circuitry.

The memory device 410 and a persistent storage 412 are examples of storage devices 404, which represent any structure(s) capable of storing and facilitating retrieval of information (such as data, program code, and/or other suitable information on a temporary or permanent basis). The memory device 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 could include a network interface card or a wireless transceiver facilitating communications over a wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

In some embodiments, the instructions executed by the processing device 402 could include instructions that implement the architecture 100 of FIG. 1 (and optionally the functionality of FIG. 2). For example, the instructions executed by the processing device 402 could include instructions that implement the various encoding and pooling layers 102-112, as well as instructions that support the data flows and data exchanges involving the layers 102-112.

Although FIG. 4 illustrates one example of a system 400 for learning and predicting time-series data, various changes may be made to FIG. 4. For example, it is assumed here that the architecture 100 of FIG. 1 providing auto-encoder functionality is implemented using software/firmware that is executed by the processing device 402. However, any suitable hardware-only implementation or any suitable hardware and software/firmware implementation could be used to implement the auto-encoder functionality. Also, computing devices come in a wide variety of configurations, and FIG. 4 does not limit this disclosure to any particular computing device.

Figure 5:
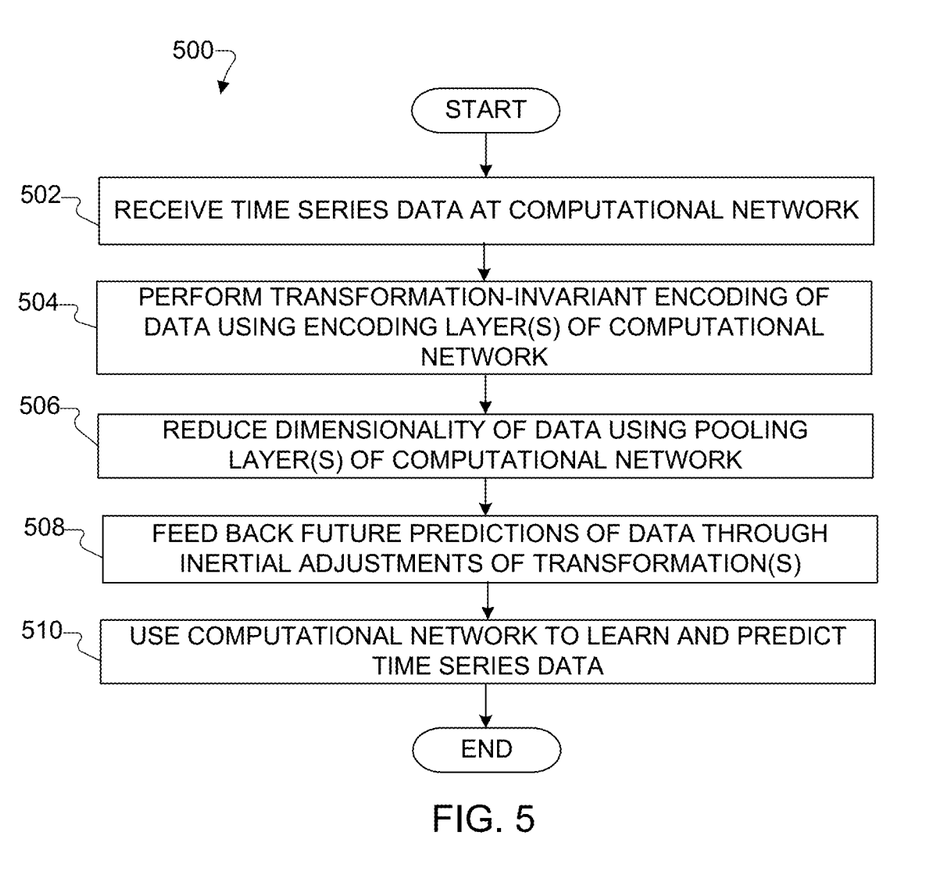
FIG. 5 illustrates an example method for learning and predicting time-series data according to this disclosure.

FIG. 5 illustrates an example method 500 for learning and predicting time-series data according to this disclosure. For ease of explanation, the method 500 is described as being implemented using the architecture 100 of FIG. 1 by the device 400 of FIG. 4. Note, however, that the method 500 could be implemented in any other suitable manner.

As shown in FIG. 5, time-series data is received at a computational network at step 502. This could include, for example, the processing device 402 receiving time-series data from any suitable source, such as one or more sensors or other input devices. This could also include the processing device 402 providing the time-series data to the encoding layer 102 of the architecture 100.

Transformation-invariant encoding of the time-series data occurs using one or more encoding layers of the computational network at step 504, and a dimensionality of the data being processed is reduced using one or more pooling layers of the computational network at step 506. This could include, for example, the processing device 402 passing the data through the various encoding layers 102-106 of the architecture 100, which encode the data. This could also include the processing device 402 passing data through the various pooling layers 108-112 of the architecture 100, which reduce the dimensionality of the data being processed. In some embodiments, the pooling layers 108-112 provide the transformation invariance for the encoding. In particular embodiments, each pooling layer 108-112 performs a pooling function, and the pooling function could represent an $l^2$ norm.

Future predictions of the time-series data are fed back through the computational network using inertial adjustments of the transformations at step 508. This could include, for example, the processing device 402 passing the feedback data exchanges 120 from lower encoding layers 102-106 to higher encoding layers 102-106. In some embodiments, the inertial adjustments of the transformations can be made based on a projection function that combines a current value of the time-series data with a previous value of the time-series data. As described above, various types of projection functions could be used. Example projection functions include an arc projection, a sequence projection, or a memory projection.

In this manner, the computational network is used to learn and predict the time-series data at step 510. This could include, for example, the processing device 402 using the computational network to learn about the time-series data so that the entire sequence of time-series data can be predicted based on a limited number of input data values.

Although FIG. 5 illustrates one example of a method 500 for learning and predicting time-series data, various changes may be made to FIG. 5. For example, while shown as a series of steps, various steps could overlap, occur in parallel, occur in a different order, or occur any number of times. As a particular example, steps 504-508 could generally overlap with each other.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
using a computational network to learn and predict time-series data, the computational network configured to receive the time-series data and perform transformation-invariant encoding of the time-series data, the computational network comprising a plurality of layer pairs, each layer pair comprising an encoding layer and a pooling layer in a one-to-one correspondence, each pooling layer configured to reduce dimensionality of data, the pooling layers providing transformation invariance for the encoding; and
feeding back future predictions of the time-series data through inertial adjustments of transformations, the inertial adjustments preserving the invariants in the computational network,
wherein the computational network was trained during a feed-forward operation in which an encoding tensor was incremented based on an actual input, a previously predicted input computed during a previous iteration of the feed-forward operation, and a previously predicted encoded output computed during the previous iteration of the feed-forward operation.

2. The method of claim 1, wherein each pooling layer performs a pooling function, the pooling function representing an $l^2$ norm.

3. The method of claim 1, wherein the inertial adjustments of the transformations are made based on a projection function that combines a current value of the time-series data with a previous value of the time-series data.

4. The method of claim 3, wherein the projection function represents an arc projection defined as:

$$2\frac{y_{\tau-1} \cdot y_\tau}{\|y_\tau\|^2} y_\tau - y_{\tau-1}$$

where $y_\tau$ denotes the current value and $y_{\tau-1}$ denotes the previous value.

5. The method of claim 3, wherein the projection function represents a sequence projection $y_{\tau-1} \otimes y_\tau \to y_{\tau+1}$ defined as:

$$e_i \otimes e_j \to e_{2j-i(\mathrm{mod}\ n)}$$

where $y_\tau$ denotes the current value, $y_{\tau-1}$ denotes the previous value, $y_{\tau+1}$ denotes a predicted future value, $e_i$ and $e_j$ respectively denote unit vectors in $i^{th}$ and $j^{th}$ directions, and n denotes a dimension of y.

6. The method of claim 3, wherein the projection function represents a memory projection $y_{\tau-1} \otimes y_\tau \to y_{\tau+1}$ defined as:

$$e_i \otimes e_j \to \Sigma_k P_{ijk} e_k$$

where $y_\tau$ denotes the current value, $y_{\tau-1}$ denotes the previous value, $y_{\tau+1}$ denotes a predicted future value, $e_i$ and $e_j$ respectively denote unit vectors in $i^{th}$ and $j^{th}$ directions, $P_{ij}$ denotes learned frequencies with a decaying distribution, and k denotes an index of a summation function $\Sigma$.

7. An apparatus comprising:
at least one processing device; and
at least one memory storing instructions that, when executed by the at least one processing device, cause the at least one processing device to:
  learn and predict time-series data using a computational network, the computational network configured to receive the time-series data and perform transformation-invariant encoding of the time-series data, the computational network comprising one or more encoding layers; and
  feed back future predictions of the time-series data through inertial adjustments of transformations, the inertial adjustments preserving the invariants in the computational network,
wherein the computational network was trained during a feed-forward operation in which an encoding tensor was incremented based on an actual input, a previously predicted input computed during a previous iteration of the feed-forward operation, and a previously predicted encoded ouput computed during the previous iteration of the feed-forward operation.

8. The apparatus of claim 7, wherein each pooling layer is configured to perform a pooling function, the pooling function representing a $l^2$ norm.

9. The apparatus of claim 7, wherein the at least one processing device is configured to make the inertial adjustments of the transformations based on a projection function that combines a current value of the time-series data with a previous value of the time-series data.

10. The apparatus of claim 9, wherein the projection function represents an arc projection defined as:

$$2 \frac{y_{\tau-1} \cdot y_\tau}{\|y_\tau\|^2} y_\tau - y_{\tau-1}$$

where $y_\tau$ denotes the current value and $y_{\tau-1}$ denotes the previous value.

11. The apparatus of claim 9, wherein the projection function represents a sequence projection $y_{\tau-1} \otimes y_\tau \to y_{\tau+1}$ defined as:

$$e_i \otimes e_j \to e_{2j-i(mod\ n)}$$

where $y_\tau$ denotes the current value, $y_{\tau-1}$ denotes the previous value, $y_{\tau+1}$ denotes a predicted future value, $e_i$ and $e_j$ respectively denote unit vectors in $i^{th}$ and $j^{th}$ directions, and n denotes a dimension of y.

12. The apparatus of claim 9, wherein the projection function represents a memory projection $y_{\tau-1} \otimes y_\tau \to y_{\tau+1}$ defined as:

$$e_i \otimes e_j \to \Sigma_k P_{ijk} e_k$$

where $y_\tau$ denotes the current value, $y_{\tau-1}$ denotes the previous value, $y_{\tau+1}$ denotes a predicted future value, $e_i$ and $e_j$ respectively denote unit vectors in $i^{th}$ and $j^{th}$ directions, $P_{ij}$ denotes learned frequencies with a decaying distribution, and k denotes an index of a summation function $\Sigma$.

13. A non-transitory computer readable medium containing instructions that, when executed by at least one processing device, cause the at least one processing device to:
  learn and predict time-series data using a computational network, the computational network configured to receive the time-series data and perform transformation-invariant encoding of the time-series data, the computational network comprising a plurality of layer pairs, each layer pair comprising an encoding layer and a pooling layer in a one-to-one correspondence, each pooling layer configured to reduce dimensionality of data, the pooling layers providing transformation invariance for the encoding; and
  feed back future predictions of the time-series data through inertial adjustments of transformations, the inertial adjustments preserving the invariants in the computational network,
wherein the computational network was trained during a feed-forward operation in which an encoding tensor was incremented based on an actual input, a previously predicted input computed during a previous iteration of the feed-forward operation, and a previously predicted encoded output computed during the previous iteration of the feed-forward operation.

14. The non-transitory computer readable medium of claim 13, wherein each pooling layer is configured to perform a pooling function, the pooling function representing a $l^2$ norm.

15. The non-transitory computer readable medium of claim 13, wherein the inertial adjustments of the transformations are based on a projection function that combines a current value of the time-series data with a previous value of the time-series data.

16. The non-transitory computer readable medium of claim 15, wherein the projection function represents an arc projection defined as:

$$2 \frac{y_{\tau-1} \cdot y_\tau}{\|y_\tau\|^2} y_\tau - y_{\tau-1}$$

where $y_\tau$ denotes the current value and $y_{\tau-1}$ denotes the previous value.

17. The non-transitory computer readable medium of claim 15, wherein the projection function represents a sequence projection $y_{\tau-1} \otimes y_\tau \to y_{\tau+1}$ defined as:

$$e_i \otimes e_j \to e_{2j-i(mod\ n)}$$

where $y_\tau$ denotes the current value, $y_{\tau-1}$ denotes the previous value, $y_{\tau+1}$ denotes a predicted future value, $e_i$ and $e_j$ respectively denote unit vectors in $i^{th}$ and $j^{th}$ directions, and n denotes a dimension of y.

18. The non-transitory computer readable medium of claim 15, wherein the projection function represents a memory projection $y_{\tau-1} \otimes y_\tau \to y_{\tau+1}$ defined as:

$$e_i \otimes e_j \to \Sigma_k P_{ijk} e_k$$

where $y_\tau$ denotes the current value, $y_{\tau-1}$ denotes the previous value, $y_{\tau+1}$ denotes a predicted future value, $e_i$ and $e_j$ respectively denote unit vectors in $i^{th}$ and $j^{th}$ directions, $P_{ij}$ denotes learned frequencies with a decaying distribution, and k denotes an index of a summation function $\Sigma$.

19. The method of claim 1, wherein the encoding tensor F was incremented according to the following:

$$(y_{\tau(pred)} - Fx_\tau) \otimes x_{\tau(pred)}$$

where F is the encoding tensor, $x_\tau$ is the actual input, $x_{\tau(pred)}$ is the previously predicted input, and $y_{\tau(pred)}$ is the previously predicteed encoded output.

20. The apparatus of claim 7, wherein the encoding tensor F was incremented according to the following:

$$(y_{\tau(pred)} - Fx_\tau) \otimes x_{\tau(pred)}$$

where F is the encoding tensor, $x_\tau$ is the actual input, $x_{\tau(pred)}$ is the previously predicted input, and $y_{\tau(pred)}$ is the previously predicteed encoded output.

21. The non-transitory computer readable medium of claim 13, wherein the encoding tensor F was incremented according to the following:

$$(y_{\tau(pred)} - Fx_\tau) \otimes x_{\tau(pred)}$$

where F is the encoding tensor, $x_\tau$ is the actual input, $x_{\tau(pred)}$ is the previously predicted input, and $y_{\tau(pred)}$ is the previously predicteed encoded output.

* * * * *